US012726063B2

(12) United States Patent
Glueck

(10) Patent No.: US 12,726,063 B2
(45) Date of Patent: Sep. 1, 2026

(54) ELECTRIC AXIAL FLUX MACHINE WITH HOUSING HAVING OPENINGS

(71) Applicant: Schaeffler Technologies AG & Co. KG, Herzogenaurach (DE)

(72) Inventor: Stefan Glueck, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 175 days.

(21) Appl. No.: 18/284,570

(22) PCT Filed: Apr. 7, 2022

(86) PCT No.: PCT/DE2022/100260
§ 371 (c)(1),
(2) Date: Sep. 28, 2023

(87) PCT Pub. No.: WO2022/218470
PCT Pub. Date: Oct. 20, 2022

(65) Prior Publication Data

US 2024/0162771 A1 May 16, 2024

(30) Foreign Application Priority Data

Apr. 12, 2021 (DE) ......................... 102021108979.4

(51) Int. Cl.
*H02K 1/2796* (2022.01)
*H02K 1/18* (2006.01)
(Continued)

(52) U.S. Cl.
CPC ........... *H02K 1/2796* (2022.01); *H02K 1/182* (2013.01); *H02K 3/26* (2013.01); *H02K 5/173* (2013.01);
(Continued)

(58) Field of Classification Search
CPC ........ H02K 1/182; H02K 1/2796; H02K 3/26; H02K 16/04; H02K 21/24; H02K 5/1737; H02K 5/207; H02K 3/42
(Continued)

(56) References Cited

U.S. PATENT DOCUMENTS 490,280 A * 1/1893 Hansen .................. H02K 25/00 310/46
4,510,409 A * 4/1985 Kanayama ............... H02K 9/02 310/67 R
(Continued)

FOREIGN PATENT DOCUMENTS

CN 103840628 A 6/2014
CN 107872111 A * 4/2018 ............. H02K 1/276
(Continued)

*Primary Examiner* — Oluseye Iwarere
*Assistant Examiner* — Daniel K Schlak
(74) *Attorney, Agent, or Firm* — Volpe Koenig

(57) ABSTRACT

An electric axial flux machine including a stator and a rotor. The rotor includes a rotor shaft in the form of a hollow shaft and at least one first disk-shaped rotor member which is non-slidably arranged on the rotor shaft for conjoint rotation therewith. The stator includes a first annular disk-shaped stator member and a second annular disk-shaped stator member which are arranged coaxially to one another and coaxially to the rotor shaft and are axially spaced apart from one another, the rotor being arranged in the space therebetween. The axial flux machine further includes a cylindrical ring-shaped motor casing which encloses the first annular disk-shaped stator member, the rotor and the second annular disk-shaped stator member in the axial direction, the cylindrical ring-shaped motor casing having a plurality of openings in its lateral surface, said openings being distributed over the circumference.

13 Claims, 4 Drawing Sheets

(51) Int. Cl.
*H02K 3/26* (2006.01)
*H02K 5/173* (2006.01)
*H02K 5/20* (2006.01)
*H02K 16/04* (2006.01)
*H02K 21/24* (2006.01)

(52) U.S. Cl.
CPC ............. *H02K 5/207* (2021.01); *H02K 16/04* (2013.01); *H02K 21/24* (2013.01); *H02K 2211/03* (2013.01)

(58) Field of Classification Search
USPC ..................................................... 310/156.35
See application file for complete search history.

(56) References Cited

U.S. PATENT DOCUMENTS 5,097,167 A 3/1992 Kanayama et al.
5,646,467 A * 7/1997 Floresta ................. H02K 23/54 310/154.06
6,246,147 B1 * 6/2001 Hockemeyer .......... H02K 7/088 310/268
9,071,118 B2 6/2015 Takemoto et al.
2005/0001509 A1 * 1/2005 Gandel ................ H02K 37/125 310/268
2007/0013251 A1 * 1/2007 Djuric ...................... H02K 3/28 310/113
2010/0090555 A1 * 4/2010 Tajima ................... H02K 21/24 29/598
2010/0117474 A1 * 5/2010 Atarashi ................ H02K 21/24 310/156.43
2010/0187933 A1 * 7/2010 Yamamoto ............ H02K 21/24 310/156.33
2010/0295389 A1 11/2010 Tessier et al.
2011/0241460 A1 10/2011 Mebarki et al.
2012/0104880 A1 5/2012 Takemoto et al.
2012/0205997 A1 * 8/2012 Hansen .................. H02K 21/24 310/64
2014/0159517 A1 * 6/2014 Furuya ................... H02K 16/04 310/43
2014/0175914 A1 * 6/2014 Zeng ..................... H02K 11/33 310/51
2015/0214789 A1 * 7/2015 Lenz ...................... H02K 1/145 310/156.02
2016/0329795 A1 11/2016 Ricci et al.
2017/0126079 A1 5/2017 Klassen et al.
2017/0141672 A1 * 5/2017 Rustvold .............. H02K 49/108
2017/0214304 A1 * 7/2017 Kim ..................... H02K 13/003
2018/0123405 A1 * 5/2018 Tang ........................ H02K 9/06
2019/0013708 A1 * 1/2019 Hattori ................... H02K 3/522
2019/0234391 A1 * 8/2019 Noh ........................ F04B 39/12
2020/0119616 A1 4/2020 Ludwig et al.
2020/0251946 A1 8/2020 Yao et al.
2020/0373797 A1 * 11/2020 Culleton, III ........ H02K 1/2713
2021/0257880 A1 * 8/2021 Vacca .................... H02K 7/003
2021/0273535 A1 * 9/2021 Specht ..................... H02K 3/26
2024/0258859 A1 * 8/2024 Kegeler ................... H02K 3/26

FOREIGN PATENT DOCUMENTS

CN 109274240 A 1/2019
CN 111900822 B 10/2021
DE 1674919 U 4/1954
DE 102012013199 A1 * 4/2013 ............. H02K 7/088
DE 102017101962 A1 * 8/2018 ............. H02K 21/24
EP 2863524 A1 4/2015
EP 3293871 A1 * 3/2018 ............. H02K 11/33
GB 2408154 A * 5/2005 ............. H02K 19/12
JP 2016086591 A * 5/2016 ............... H02K 1/22
KR 2006091114 A * 1/2005 ............... H02K 1/27

* cited by examiner

ELECTRIC AXIAL FLUX MACHINE WITH HOUSING HAVING OPENINGS

CROSS-REFERENCE TO RELATED APPLICATIONS

This application is the U.S. National Phase of PCT Appln. No. PCT/DE2022/100260, filed Apr. 7, 2022, which claims the benefit of German Patent Appln. No. 102021108979.4, filed Apr. 12, 2021, the entire disclosures of which are incorporated by reference herein.

TECHNICAL FIELD

The present disclosure relates to an electric axial flux machine, comprising a stator and a rotor, wherein the rotor has a rotor shaft, in particular formed as a hollow shaft, with at least one first disk-shaped rotor member arranged on the rotor shaft in a non-rotatable and non-displaceable manner, wherein the stator comprises a first annular disk-shaped stator member and a second annular disk-shaped stator member, which are arranged coaxially with respect to one another and to the rotor shaft and are axially spaced apart from one another with the rotor being arranged therebetween, and wherein a first air gap is formed between the first annular disk-shaped stator member and the rotor, spaced apart in the axial direction, and a second air gap is formed between the second annular disk-shaped stator member and the rotor, wherein the rotor has a plurality of receiving slots distributed equidistantly over the circumference and extending radially through the rotor body, in which a rotor magnet each is fixed, wherein the axial flux machine further has a cylindrical ring-shaped motor housing which encloses the first annular disk-shaped stator member, the rotor and the second annular disk-shaped stator member in the axial direction.

BACKGROUND

An axial flux machine is a dynamo-electric machine in which the magnetic flux between the rotor and stator runs parallel to the axis of rotation of the rotor. Often, both the stator and the rotor are designed to be largely in the shape of a disk. Axial flux machines are particularly advantageous when the axially available installation space is limited in a given application. This is often the case, for example, with electric drive systems for electric vehicles.

In addition to the shortened axial installation length, a further advantage of the axial flux machine is its comparatively high torque density. The reason for this is, compared to radial flux machines, the larger air gap area which is available for a given installation space. Furthermore, a lower iron volume is required compared to conventional machines, which has a positive effect on the efficiency of the machine.

Typically, an axial flux machine comprises at least one stator having windings for generating the axially aligned magnetic field. At least one rotor is equipped with permanent magnets, for example, whose magnetic field interacts with the magnetic field of the stator windings in order to generate a drive torque over an air gap.

In order to realize a particularly compact and highly integrated axial flux machine, it is also known to design the stators as printed circuit boards. For example, a stator for an axial flux machine is known from EP 2863524 A1, which is designed in the form of a printed circuit board (PCB). The PCB is designed as a multi-layer board, i.e. it comprises several layers with conductive traces on top of one another. This allows the windings of a coil to be distributed over these multiple layers. It is also known from this publication that one turn of a winding can extend to several layers of the multi-layer board.

Such axial flux machines are also used in unmanned drones, for example. Due to the design of such axial flux machines, a part of the magnetic field can also emerge at the circumference of the rotor and then generate eddy currents in the motor housing. These lead to increased motor losses, which is generally undesirable.

SUMMARY

It is therefore the object of the present disclosure to provide an axial flux machine which reduces or completely avoids the disadvantages known from the prior art and to provide an axial flux machine with improved efficiency while maintaining a compact design.

This object is achieved by an electric axial flux machine, comprising a stator and a rotor, wherein the rotor has a rotor shaft, in particular formed as a hollow shaft, with at least one first disk-shaped rotor member and arranged on the rotor shaft in a non-rotatable and non-displaceable manner, wherein the stator comprises a first annular disk-shaped stator member and a second annular disk-shaped stator member, which are arranged coaxially with respect to one another and to the rotor shaft and are axially spaced apart from one another with the rotor being arranged therebetween, and wherein a first air gap is formed between the first annular disk-shaped stator member and the rotor, spaced apart in the axial direction, and a second air gap is formed between the second annular disk-shaped stator member and the rotor, wherein the rotor has a plurality of receiving slots distributed equidistantly over the circumference and extending radially through the rotor body, in which a rotor magnet each is fixed, wherein the axial flux machine further has a cylindrical ring-shaped motor housing which encloses the first annular disk-shaped stator member, the rotor and the second annular disk-shaped stator member in the axial direction, wherein the cylindrical ring-shaped motor housing has a plurality of openings distributed over the circumference in its lateral surface.

According to the disclosure, the motor housing, which encloses the two stator bodies and covers the rotor region, is provided with openings over its circumference in the rotor region, which are preferably designed as axially extending slots. This allows circulating or wandering eddy currents to be suppressed as far as possible, thus optimizing the efficiency of the axial flux machine. The openings in the motor housing can be formed without major changes to the housing dimensions and at low cost. This also applies in particular if the motor housing is advantageously designed as a deep-drawn part.

The magnetic flux in an electric axial flux machine (AFM) according to the disclosure is directed axially to a direction of rotation of the rotor of the axial flux machine in the air gap between the stator and the rotor. Different types of axial flux machines exist. One known type is what is termed an I arrangement, in which the rotor is arranged so as to be axially adjacent to a stator or between two stators. Another known type is what is termed an H arrangement, in which two rotors are arranged on opposite axial sides of a stator. The axial flux machine according to the disclosure can be configured in particular as an I-type. In principle, it is also possible for a plurality of rotor-stator configurations to be arranged axially adjacent as an I-type and/or H-type. It would also be possible in this context to arrange both one or more I-type rotor-stator configurations and one or more H-type rotor-stator configurations adjacent to one another in the axial direction. In particular, it is also preferable that the rotor-stator configurations of the H-type and/or the I-type are each designed essentially identically, so that they can be assembled in a modular manner to form an overall configuration. Such rotor-stator configurations can in particular be arranged to be coaxial to one another and can be connected to a common rotor shaft or to a plurality of rotor shafts.

The rotor of an electric axial flux machine can preferably be designed at least in parts as a laminated rotor. A laminated rotor is designed to be layered in the axial direction. Alternatively, the rotor of an axial flux machine can also have a rotor carrier or rotor body which is correspondingly equipped with magnetic sheets and/or SMC material and with magnetic elements designed as permanent magnets.

In a preferred manner, a rotor body has an inner part via which the rotor can be connected to a shaft in a non-rotatable manner, and an outer part which delimits the rotor in a radially outward direction. The rotor body can be formed between the inner part and the outer part with several rotor struts, via which the inner part and the outer part are connected to one another and which, together with the radial outer surface of the inner part and the radial inner surface of the outer part, forms a receiving space for receiving the magnetic elements and the flux conducting elements of the rotor. As an alternative to the receiving space, the magnetic elements can be arranged or placed on the rotor carrier.

A magnetic element can be formed as a permanent magnet in the form of a bar magnet or in the form of smaller magnet blocks. The magnetic elements are usually arranged in, at or on a rotor carrier. The magnetic element of a rotor of an axial flux machine, which is designed as a permanent magnet, interacts with a rotating magnetic field generated by the stator winding coils, which are usually supplied with a three-phase current.

A rotor shaft is a rotatably mounted shaft of an electric machine to which the rotor or rotor body is coupled in a non-rotatable manner.

The stator of an electric axial flux machine preferably has a stator body with a plurality of stator windings arranged in the circumferential direction. The stator body can be designed to be in one piece or segmented, as seen in the circumferential direction. The stator body can be formed from a laminated stator core with multiple laminated electrical sheets. Alternatively, the stator body can also be formed from a compressed soft magnetic material, such as what is termed an SMC (soft magnetic composite) material.

According to an advantageous embodiment of the disclosure, the first annular disk-shaped stator member and/or the second annular disk-shaped stator member can be designed as a circuit board, in particular as a printed circuit board, whereby the stator body can be manufactured in a particularly compact and cost-effective manner. The circuit board is preferably a multi-layer board with multiple copper layers over which the stator windings extend. A further possible embodiment is to design the stator body as a sandwich of several multi-layer boards.

According to a further preferred further development of the disclosure, the motor housing can be formed from a first annular disk and a second annular disk, which are connected to one another in a form-fitting manner and/or by a substance-to-substance connection by means of connecting web extending in the axial direction. A further possible embodiment is thus the design of the motor housing as a multi-part motor housing, in which the stators are each seated in electrically insulating housing parts and the connecting webs connect the two housing parts. The connecting webs can, for example, be connected to the annular disks in the form of needles in a form-fitting and/or force-fitting manner or by means of a substance-to-substance connection. This can prevent a current flow along the outer edge of the openings in the solid material.

Furthermore, according to an equally advantageous embodiment of the disclosure, at least one of the annular disks can be formed from one of the stator bodies designed as circuit boards, thereby enabling a particularly compact design of the axial flux machine with a high level of component integration.

According to a further particularly preferred embodiment of the disclosure, the openings in the lateral surface of the motor housing can completely cover the rotor body in its axial extent. A further possible improvement can thus be achieved by significantly lengthening the, for example, slot-like openings in the axial direction and extending them beyond the stators in the axial direction in order to reduce eddy currents passing through the solid material of the motor housing at the outer edges of the openings. It is therefore particularly preferable that the openings in the lateral surface of the motor housing cover the first annular disk-shaped stator member and/or the second annular disk-shaped stator member in the axial direction at least partially, preferably completely.

In a likewise preferred embodiment of the disclosure, the first annular disk-shaped stator member and/or the second annular disk-shaped stator member can be received in a non-rotatable manner in the motor housing and connected thereto, so that separate spacers between the stators can be dispensed with.

It can also be advantageous to further develop the disclosure such that the openings have a substantially rectangular contour, the axial extent of which is greater than their circumferential extent, which has been found to be a good compromise between structural stability of the motor housing and the reduction of eddy currents.

According to a further embodiment of the subject matter of the disclosure to be preferred, the motor housing can be formed from a metallic material and/or ceramic and/or a plastic and/or a composite material.

Finally, according to a further preferred embodiment of the disclosure, the housing is a needle bearing cage, which is configured in particular as a pocket cage and is intended for use in a needle rolling bearing. This makes it possible to use an existing component that is being manufactured in high volumes, which means that the manufacturing costs of the axial flux machine can be further optimized.

BRIEF DESCRIPTION OF THE DRAWINGS

The disclosure will be explained in more detail below with reference to figures without limiting the general concept of the disclosure.

In the figures.

DETAILED DESCRIPTION

Figure 1:
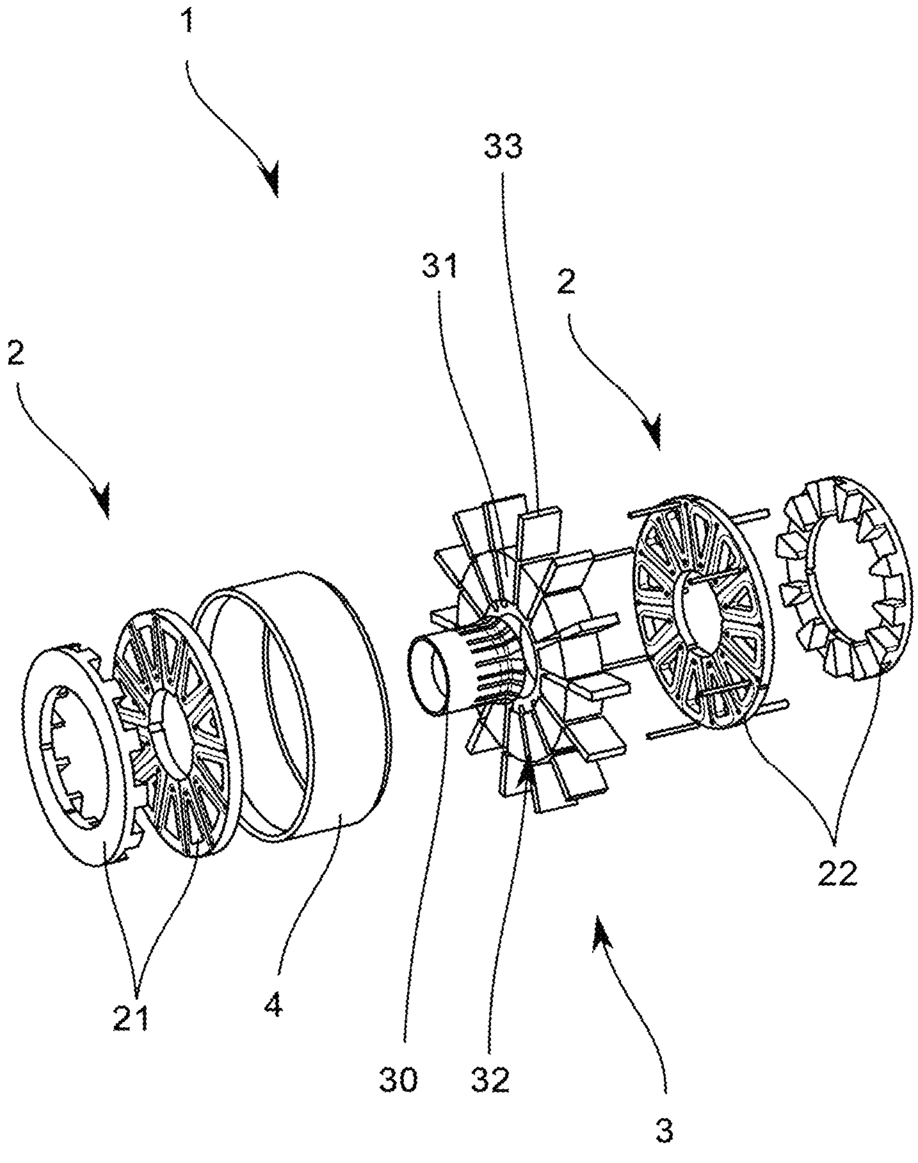
FIG. 1 shows an axial flux machine in a perspective exploded view.

FIG. 1 shows an electric axial flux machine 1, comprising a stator 2 and a rotor 3, wherein the rotor 3 has a rotor shaft 30, in particular formed as a hollow shaft, with a first disk-shaped rotor member 31 arranged on the rotor shaft 30 in a non-rotatable and non-displaceable manner. The stator 2 has a first annular disk-shaped stator member 21 and a second annular disk-shaped stator member 22, which are arranged coaxially with respect to one another and to the rotor shaft 30 and are axially spaced apart from one another with the rotor 3 being arranged therebetween.

A first air gap is formed between the first annular disk-shaped stator member 21 and the rotor 3, spaced apart in the axial direction, and a second air gap is formed between the second annular disk-shaped stator member 22 and the rotor 3. The rotor 3 has a plurality of receiving slots 32 distributed equidistantly over the circumference and extending radially through the rotor body 31, in which a rotor magnet 33 each is fixed.

The axial flux machine 1 further comprises a cylindrical ring-shaped motor housing 4 which encloses the first annular disk-shaped stator member 21, the rotor 3 and the second annular disk-shaped stator member 22 in the axial direction.

Figure 2:
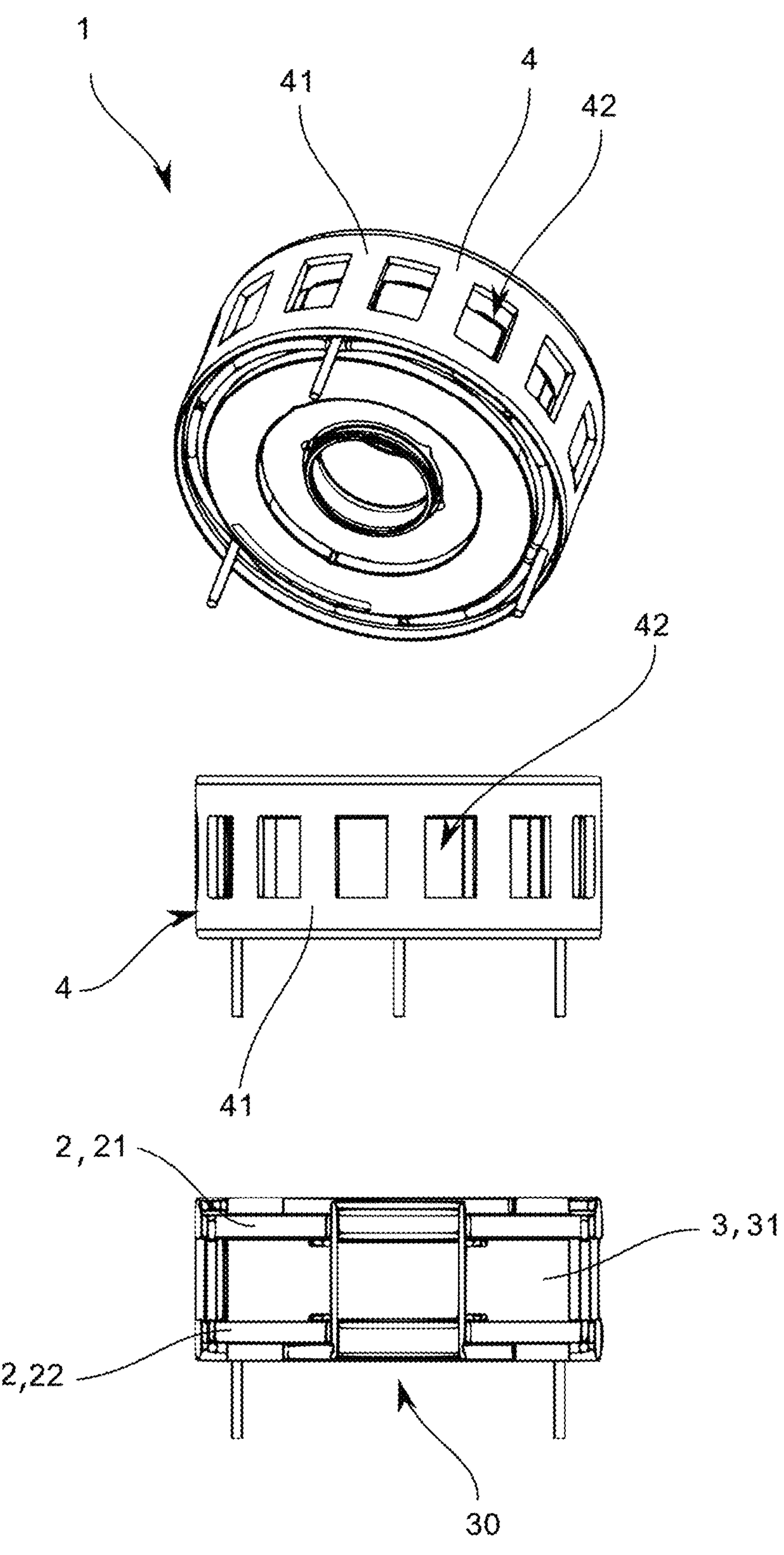
FIG. 2 shows a first embodiment of an axial flux machine in a perspective view, a side view and an axial sectional view.

The cylindrical ring-shaped motor housing 4 has a plurality of openings 42 distributed over the circumference in its lateral surface 41, which is not shown in the representation of FIG. 1, but can be seen in the corresponding views of FIG. 2. The openings 42 in the lateral surface 41 of the motor housing 4 completely cover the rotor body 31 in its axial extent. The openings 42 have a substantially rectangular contour, the axial extent of which is greater than their circumferential extent. The motor housing 4 is formed from a metallic material.

The motor housing 4 shown in FIG. 2 can in particular also be a needle bearing cage, which is configured in particular as a pocket cage and is intended for use in a needle rolling bearing.

The first annular disk-shaped stator member 21 and the second annular disk-shaped stator member 22 are designed as a circuit board, in particular as a printed circuit board, also referred to as a PCB.

Figure 3:
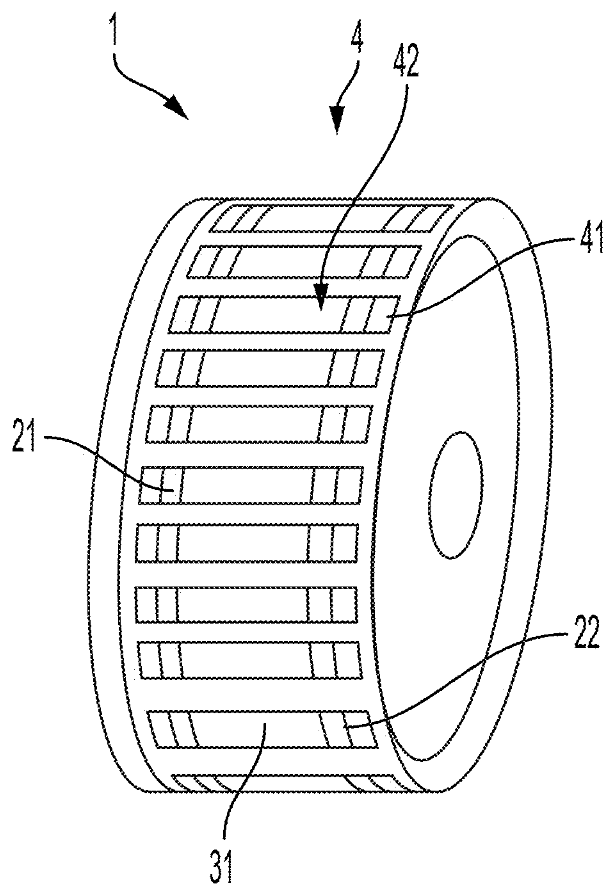
FIG. 3 shows a second embodiment of an axial flux machine in a perspective view.

FIG. 3 shows an embodiment of the axial flux machine in which the openings 42 in the lateral surface 41 of the motor housing 4 completely cover the first annular disk-shaped stator member 21 and the second annular disk-shaped stator member 22 in the axial direction. The first annular disk-shaped stator member 21 and the second annular disk-shaped stator member 22 are received in a non-rotatable manner in the motor housing 4 and are connected thereto.

Figure 4:
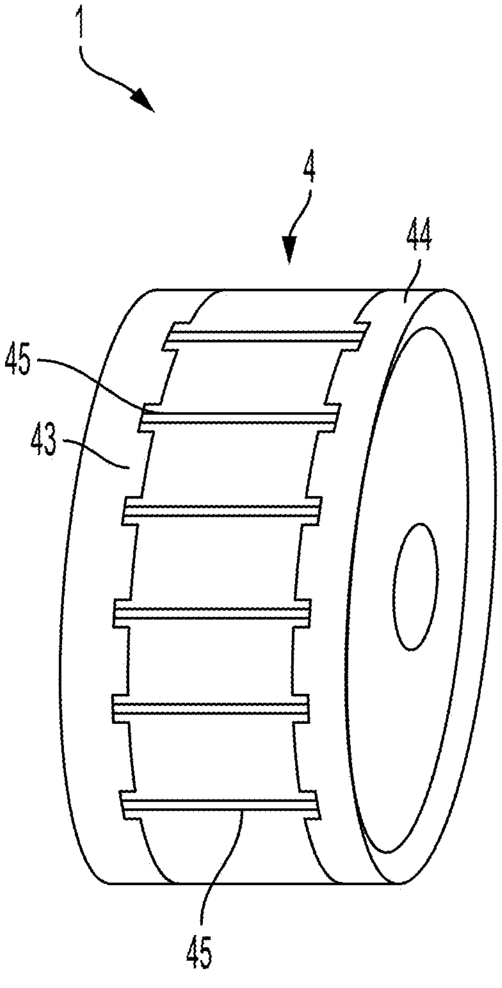
FIG. 4 shows a third embodiment of an axial flux machine in a perspective view.

FIG. 4 shows an embodiment of the axial flux machine in which the motor housing 4 is formed from a first annular disk 43 and a second annular disk 44, which are connected to one another in a form-fitting manner and/or by a substance-to-substance connection by means of connecting webs 45 extending in the axial direction. In the exemplary embodiment shown, the annular disks 43,44 have receptacles for the connecting webs 45 arranged equidistantly in the circumferential direction, into which the connecting webs 45 can be inserted, in particular in a form-fitting and/or force-fitting manner. The connecting webs 45 can be formed from the same material as or different from the material of the annular disks 43,44. At least one of the annular disks 43,44 can also be formed from one of the stator bodies 21,22 designed as circuit boards.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Axial flux machine
2 Stator
3 Rotor
4 Motor housing
21 Stator body
22 Stator body
30 Rotor shaft
31 Rotor body
32 Receiving slots
33 Rotor magnet
41 Lateral surface
42 Openings
43 Annular disk
44 Annular disk
45 Connecting webs

The invention claimed is:

1. An electric axial flux machine, comprising:

a stator, and a rotor, wherein the rotor includes a rotor shaft with a rotor body arranged on the rotor shaft in a non-rotatable and non-displaceable manner;

wherein the stator includes a first annular disk-shaped stator member and a second annular disk-shaped stator member arranged coaxially with respect to one another and to the rotor shaft and axially spaced apart from one another with the rotor being arranged therebetween, and wherein a first air gap is formed between the first annular disk-shaped stator member and the rotor and a second air gap is formed between the second annular disk-shaped stator member and the rotor, wherein the rotor has a plurality of receiving slots distributed equidistantly over a circumference and extending radially through the rotor body, in each of which a rotor magnet is fixed, wherein the axial flux machine further includes a cylindrical ring-shaped motor housing which encloses the first annular disk-shaped stator member, the rotor and the second annular disk-shaped stator member in the axial direction, wherein the cylindrical ring-shaped motor housing has a plurality of openings distributed over a circumference of a lateral surface thereof;

wherein each one of the plurality of openings in the lateral surface of the motor housing has a substantially rectangular contour, an axial extent of which is greater than a circumferential extent, and wherein each one of the plurality of openings in the lateral surface of the motor housing completely covers the rotor body in its axial extent.

2. The axial flux machine according to claim 1, wherein at least one of the first annular disk-shaped stator member or the second annular disk-shaped stator member are configured as a printed circuit board.

3. The axial flux machine according to claim 1, wherein, the motor housing is formed from a first annular disk and a second annular disk connected to one another in a form-fitting manner or by a substance-to-substance connection by means of connecting webs extending in the axial direction.

4. The axial flux machine according to claim 3, wherein, at least one of the annular disks is formed from one of the first annular disk-shaped stator member or the second annular disk-shaped stator member configured as a circuit board.

5. The axial flux machine according to claim 1, wherein the plurality of openings in the lateral surface of the motor housing cover at least one of the first annular disk-shaped stator member or the second annular disk-shaped stator member in the axial direction at least partially.

6. The axial flux machine according to claim 1, wherein at least one of the first annular disk-shaped stator member or the second annular disk-shaped stator member is received in a non-rotatable manner in the motor housing and connected thereto.

7. The axial flux machine according to claim 1, wherein, the motor housing is formed from at least one of a metallic material, a ceramic, a plastic, or a composite material.

8. The axial flux machine according to claim 1, wherein, the motor housing includes a needle bearing cage.

9. The axial flux machine according to claim 1, wherein the motor housing is formed from a first annular disk and a second annular disk connected to one another by a substance-to-substance connection by means of connecting webs extending in the axial direction, and wherein the annular disks include receptacles in which the connecting webs are received.

10. The axial flux machine according to claim 1, wherein each one of the plurality of openings in the lateral surface extends axially beyond each axial side of the rotor body.

11. A rotor and stator assembly for an axial flux machine, comprising:

a rotor shaft with a rotor body arranged on the rotor shaft in a non-rotatable and non-displaceable manner;

a first annular disk-shaped stator member and a second annular disk-shaped stator member arranged coaxially with respect to one another and to the rotor shaft and axially spaced apart from one another with the rotor body being arranged therebetween, and wherein a first air gap is formed between the first annular disk-shaped stator member and the rotor body and a second air gap is formed between the second annular disk-shaped stator member and the rotor body, wherein the rotor body has a plurality of receiving slots distributed equidistantly over a circumference and extending radially through the rotor body, in each of which a rotor magnet is fixed, wherein a cylindrical ring-shaped motor housing encloses the first annular disk-shaped stator member, the rotor body and the second annular disk-shaped stator member in the axial direction, wherein the cylindrical ring-shaped motor housing has a plurality of openings distributed over a circumference of a lateral surface thereof;

wherein each one of the plurality of openings in the lateral surface of the motor housing has a substantially rectangular contour, an axial extent of which is greater than a circumferential extent, and wherein each one of the plurality of openings in the lateral surface of the motor housing completely covers the rotor body in its axial extent.

12. The rotor and stator assembly according to claim 11, wherein at least one of the first annular disk-shaped stator member or the second annular disk-shaped stator member are configured as a printed circuit board.

13. The rotor and stator assembly according to claim 11, wherein each one of the plurality of openings in the lateral surface extends axially beyond each axial side of the rotor body.

* * * * *